M. J. TODD.
COUPLING LOCK FOR WHEELED VEHICLES.
APPLICATION FILED APR. 23, 1913.
1,103,452.
Patented July 14, 1914.
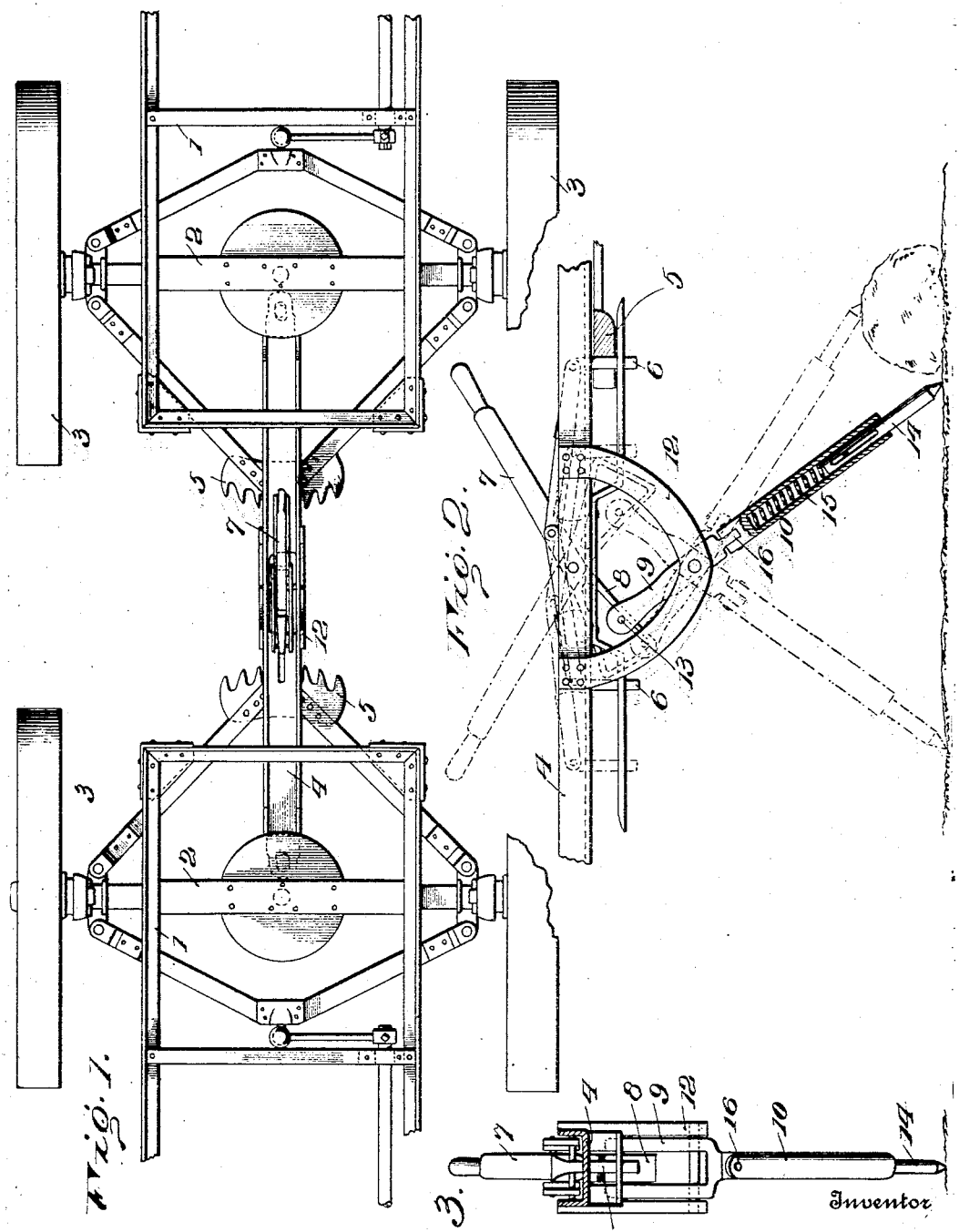

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

COUPLING-LOCK FOR WHEELED VEHICLES.

1,103,452. Specification of Letters Patent. Patented July 14, 1914.

Application filed April 23, 1913. Serial No. 763,138.

*To all whom it may concern:*

Be it known that I, MARQUIS J. TODD, of Buffalo, in the county of Erie and State of New York, have invented certain new and useful Improvements in Coupling-Locks for Wheeled Vehicles; and I do hereby declare the following to be a full, clear, and exact description of the invention, such as will enable others skilled in the art to which it appertains to make and use the same.

In an application for patent filed by me April 22, 1913, Serial No. 762,825, I described means for locking a coupling-bar to either of two adjacent vehicles of a train of vehicles, the means described for that purpose in such application being manually-shiftable so that as the coupling member is locked to one vehicle it is unlocked from the next adjacent vehicle.

The object of the present invention is to provide for automatically locking and unlocking the coupling member coincident with any reversal of direction of travel of the train, such coupling member being always locked to the forward end of the following or succeeding vehicle.

In the accompanying drawings, Figure 1 is a top plan view showing portions of two adjacent vehicles equipped with my present improvement. Fig. 2 is an enlarged elevation of a coupling member together with its locking means. Fig. 3 is an end view thereof.

In the drawings I have shown portions of two adjacent vehicles, but in actual practice a train may be composed of any desired number of vehicles, and in each instance the axles of the carrying-wheels are pivoted and connected so as to effect coöperative shifting of the latter in opposite directions in turning curves.

1 designates the chassis of a vehicle; 2 the pivoted axles thereof; and 3 the carrying wheels, the axles of which are centrally pivoted, but if desired pivoted stub-axles may be employed.

4 is a coupling member which is shown in the form of a bar pivoted at its ends to the adjacent vehicles, centrally thereof, and in addition to its pivotal connection this bar is capable of being locked to either of the vehicles so as to extend rigidly therefrom. Each vehicle is shown as equipped with a rack 5 connected to the pivoted axles and to which the coupling bar is designed to be locked. As pointed out in my before noted application for patent, in unlocking the bar from one vehicle it is locked to the next adjacent vehicle, such change being necessary when the direction of travel is reversed. The locking means may be of any preferred form of construction, but I have found that shown to be highly advantageous. It comprises two pins 6 capable of being shifted by a lever 7 fulcrumed on the bar. While this lever may be operated manually, to change the locking arrangement, it is the purpose of my present invention to avoid the necessity of such manual operation, and hence save the time heretofore required for that purpose, by automatically moving the lock lever from one position to the other coincident with the reversal of direction of travel of the train. The means shown for accomplishing this purpose is designed to engage with the road and to be automatically actuated by the act of reversing the direction of travel of the train, but the particular construction may be widely varied. I have shown the element 7 as a lever of the first order, its lower arm 8 being in the form of a loop which depends below the plane of the coupling bar. This arm 8 is engaged by the upper arm 9 of a second lever 10 which is fulcrumed between spaced-apart hangers 12 depending from the coupling bar. I have shown arm 9 composed of spaced-apart members between which arm 8 is designed to extend, and having a cross pin 13 which projects through the opening in arm 8. Normally the lever 10 occupies a rearwardly inclined position about at right angles to the plane of lock lever 7. The normal length of the longer arm of lever 10 is greater than the distance between its fulcrum and the road on a vertical plane through said fulcrum. As the train is traveling the lever 10 drags over the road, and should it encounter an obstruction, will readily ride thereover without affecting lock lever 7. When the direction of travel is reversed the lower end of lever 10 entering the ground holds the lever and causes it to turn on its fulcrum, and in so turning it shifts the lock lever 7, thereby unlocking the coupling bar from one vehicle and locking it to the other.

To allow of the necessary shortening in the length of lever 10 as it assumes an upright position, the longer arm thereof is shown as provided with a plunger 14 which is normally held extended by a coil spring 15 inclosed within said arm. To enable the shifting lever to be thrown out of the way, as when it is desired to manually operate the lock lever 7, I form the longer arm of lever 10 in two parts united by a joint 16, which will permit the lower part to be moved laterally. In some instances it may be so moved by obstructions in the road.

The advantages of my present invention will be readily appreciated. It will be noted that by means thereof it is unnecessary for an attendant to go between several vehicles of a train to shift the locks since the mere reversal of the direction of travel of the train will bring about the necessary change in the locking of each coupling bar.

I claim as my invention:

1. In combination with a pair of wheeled vehicles, a coupling member between such vehicles, locking means carried by said coupling member for locking the latter to one or the other of said vehicles, and means for automatically shifting said locking means, coincident with the reversal of direction of travel of the vehicles, to unlock the coupling member from one vehicle as it is locked to the other vehicle.

2. In combination with a pair of wheeled vehicles, a coupling member between such vehicles, locking means carried by said coupling member for locking the latter to one or the other of said vehicles, and means carried by said coupling member for automatically actuating said locking means, coincident with the reversal of direction of travel of the vehicles, to unlock the coupling member from one vehicle as it is locked to the other vehicle.

3. In combination with a pair of wheeled vehicles, a coupling member between such vehicles, locking means carried by said coupling member for locking the latter to one or the other of said vehicles, and a shifting member carried by said coupling member for automatically actuating said locking means when the direction of travel of the vehicles is reversed.

4. In combination with a pair of wheeled vehicles, a coupling member between such vehicles, locking means carried by said coupling member for locking the latter to one or the other of said vehicles, an arm pivoted to and depending from said coupling member and designed to engage the road, said arm normally lying at an oblique angle to the coupling member, and means actuated by the shifting of said arm, consequent upon the reversal of direction of travel of the vehicles, for unlocking said coupling member from one vehicle and locking it to the other vehicle.

5. In combination with a pair of wheeled vehicles, a coupling member between such vehicles, locking means carried by said coupling member for locking the latter to one or the other of said vehicles, and comprising a lever capable of occupying two positions, a second lever carried by said coupling bar and engaging the first mentioned lever, said second lever normally occupying an oblique position relatively to the coupling member and designed to be turned on its fulcrum by engaging with the road consequent upon the reversal of direction of travel of the vehicles, and, thereby, through the first mentioned lever, effect the shifting of said locking means.

6. In combination with a pair of wheeled vehicles, a coupling bar between such vehicles, means for locking the coupling bar to either vehicle, said locking means comprising a lever mounted on said coupling bar, a second lever also mounted on said coupling bar and having a sliding engagement with the first mentioned lever for effecting the shifting thereof as the second mentioned lever is shifted by its engagement with the road consequent upon a reversal in the direction of travel of the vehicles, said second lever having a spring-pressed plunger for engaging the road bed.

7. In combination with a pair of wheeled vehicles, a coupling bar between such vehicles, means for locking the coupling bar to either vehicle, said locking means comprising a lever mounted on said coupling bar, a second lever also mounted on said coupling bar and having a sliding engagement with the first mentioned lever for effecting the shifting thereof as the second mentioned lever is shifted by its engagement with the road consequent upon a reversal in the direction of travel of the vehicles, said second lever having its lower arm jointed and capable of being moved laterally.

8. In combination with a pair of wheeled vehicles, a coupling bar between such vehicles, means for locking the coupling bar to either vehicle, said locking means comprising a lever mounted on said coupling bar, and having its lower arm in the form of a loop, a second lever also fulcrumed on said coupling bar and having a pin projecting through said loop whereby, as the second mentioned lever is shifted by its engagement with the road, the first mentioned lever will be turned on its fulcrum, said second mentioned lever being capable of limited movement without affecting the first mentioned lever.

In testimony whereof, I have signed this specification in the presence of two subscribing witnesses.

MARQUIS J. TODD.

Witnesses:
FRANCIS S. MAGUIRE,
MILDRED P. IMIRIE.